S. T. Field,
Making Wooden Eaves-Troughs.
N° 31,449. Patented Feb. 19, 1861.

Witnesses.

Inventor.
Sam'l T. Field
By his Attorney
Thomas H. Dodge

UNITED STATES PATENT OFFICE.

SAMUEL T. FIELD, OF WORCESTER, MASSACHUSETTS.

PROCESS FOR MANUFACTURING WOODEN EAVES-TROUGHS AND PIPING.

Specification of Letters Patent No. 31,449, dated February 19, 1861.

*To all whom it may concern:*

Be it known that I, SAMUEL T. FIELD, of the city and county of Worcester, in the State of Massachusetts, have invented a certain new and useful Mode or Process of Manufacturing Wooden Eaves-Troughs, Gutters, and Conductors at One and the Same Operation; and I do hereby declare that the following is a full, clear, and exact description of the same, reference being had to the accompanying drawings, forming a part of this specification.

Figure 2:
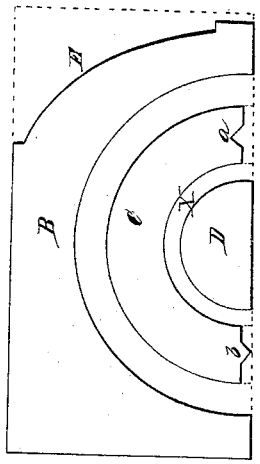
Figure 4:
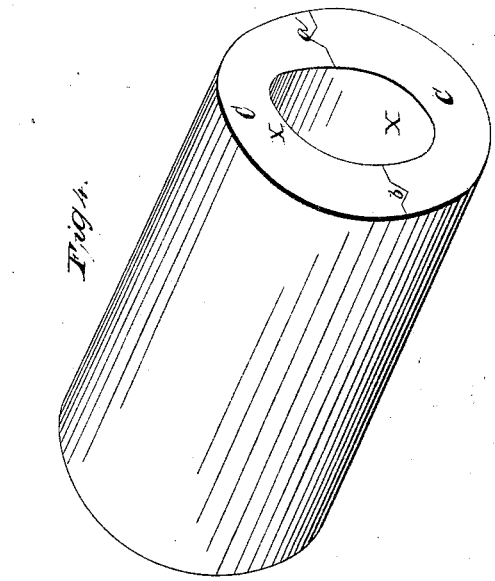
Figure 1:
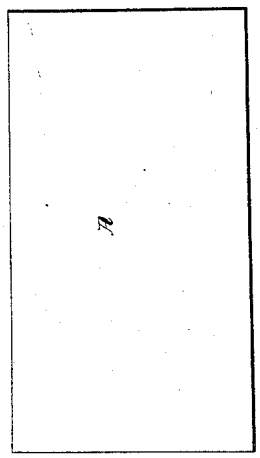
Figure 3:
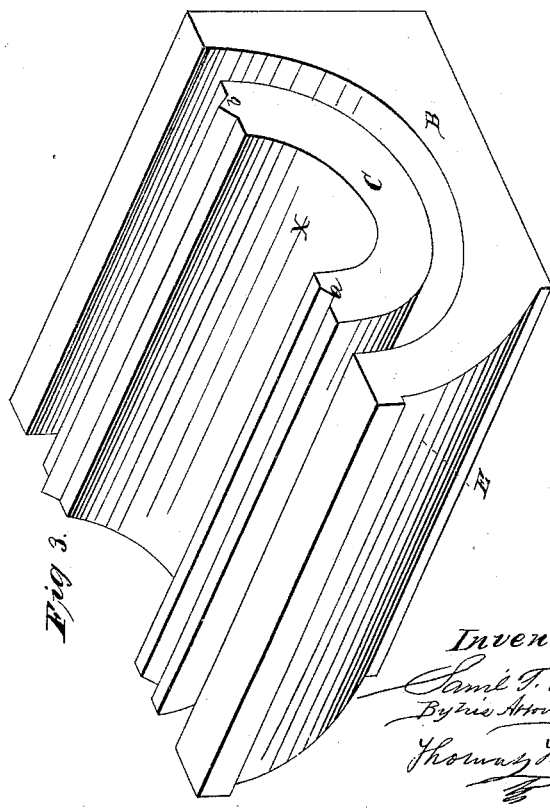

In the drawings A, Figure 1, represents an end view of a piece of wood suitable for the purpose, such as pine or spruce, which is to be taken and placed upon a table or platform through which works a tubular saw. The stick or timber is now to be fed forward by suitable mechanism, so that the piece of timber will be cut lengthwise into two pieces, of the form indicated by the parts marked B, and C,—C, being left of a semi-cylindrical form, which, as it passes over a revolving cutter, forms the cavity X. It will be understood that by the use of suitable revolving tools, or cutters, properly applied, that tongue $b$, groove $a$, and molding E, can be formed, before the timber or stick leaves the machine, if preferred.

The inner surface of the eaves trough is left even and true, so that water is not liable to stand in it, causing premature decay, while the material or part C, cut out to form the trough is left in the proper shape to form conductors.

I do not deem it necessary to enter into a detailed description of the machine used by me in the manufacture of the above described eaves troughs and conductors, since it is fully described in Letters Patent granted to me on the first day of February 1857.

Having described my invention, what I claim and desire to secure by Letters Patent, is—

The mode or process above described of manufacturing wooden eaves troughs and material for tubular conductors at one and the same operation, and from the same stick of timber.

In witness whereof I have hereunto subscribed my name.

SAMUEL T. FIELD.

In presence of—
　W. W. RICE,
　T. L. NELSON.